(12) United States Patent
Ding et al.

(10) Patent No.: US 11,597,635 B2
(45) Date of Patent: Mar. 7, 2023

(54) ACTIVE STEERING SYSTEM FOR HOISTING MACHINERY AND HOISTING MACHINERY

(71) Applicant: Xuzhou Heavy Machinery Co., Ltd., Xuzhou (CN)

(72) Inventors: Honggang Ding, Xuzhou (CN); Jiankai Chen, Xuzhou (CN); Li Li, Xuzhou (CN); Pengcheng Lu, Xuzhou (CN); Yunwang Ma, Xuzhou (CN); Shuyuan Cao, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 907 days.

(21) Appl. No.: 16/466,496

(22) PCT Filed: Dec. 5, 2016

(86) PCT No.: PCT/CN2016/108519
§ 371 (c)(1),
(2) Date: Jun. 4, 2019

(87) PCT Pub. No.: WO2018/102956
PCT Pub. Date: Jun. 14, 2018

(65) Prior Publication Data
US 2019/0315606 A1    Oct. 17, 2019

(51) Int. Cl.
*B62D 5/04*    (2006.01)
*B62D 5/20*    (2006.01)
(Continued)

(52) U.S. Cl.
CPC .............. *B66C 23/62* (2013.01); *B62D 5/04* (2013.01); *B62D 5/20* (2013.01); *B66C 23/36* (2013.01)

(58) Field of Classification Search
CPC .............. B62D 5/04; B62D 5/20; B66C 23/36
(Continued)

(56) References Cited

U.S. PATENT DOCUMENTS

| 3,831,701 A | 8/1974 | Pilon et al. |
| 7,063,636 B2 * | 6/2006 | Augustine .............. B62D 5/008 180/446 |

(Continued)

FOREIGN PATENT DOCUMENTS

| CN | 201165454 | 12/2008 |
| CN | 201201869 | 3/2009 |

(Continued)

OTHER PUBLICATIONS

Extended European Search Report for corresponding EP Application No. 16923582.7 dated Jun. 9, 2020, 8 pages.
(Continued)

*Primary Examiner* — Tony H Winner
(74) *Attorney, Agent, or Firm* — Myers Bigel, P.A.

(57) ABSTRACT

A hoisting machinery comprises a steering wheel and wheels, wherein the active steering system comprises an active steering device, a hydraulic power steering gear and a hydraulic power steering system, the active steering device is arranged between the steering wheel and a pitman arm of the hoisting machinery, so as to adjust a steering ratio of the steering wheel to the pitman arm according to a driving cycle of the hoisting machinery, and the hydraulic power steering gear is arranged between the steering wheel and the pitman arm, so as to control the hydraulic power steering system to drive steering of the wheels. In the active steering system of the present invention, a hydraulic power steering system is adopted to drive steering of wheels, which can improve capability of overcoming steering resistance and
(Continued)

can be applicable to multiple chassis of cranes, thereby enlarging application ranges of the active steering system.

11 Claims, 2 Drawing Sheets

(51) Int. Cl.
  *B66C 23/62* (2006.01)
  *B66C 23/36* (2006.01)

(58) Field of Classification Search
  USPC .......................................................... 180/444
  See application file for complete search history.

(56) References Cited

U.S. PATENT DOCUMENTS

| | | | | |
|---|---|---|---|---|
| 7,306,535 | B2* | 12/2007 | Menjak | B62D 5/008 74/498 |
| 7,974,754 | B2* | 7/2011 | Nakatsu | B62D 5/008 180/443 |
| 8,515,622 | B2* | 8/2013 | Shah | B62D 6/002 701/42 |
| 8,672,085 | B2* | 3/2014 | Huang | B62D 5/008 180/443 |
| 10,071,760 | B2* | 9/2018 | Oh | B62D 6/02 |
| 2006/0052201 | A1 | 3/2006 | Augustine et al. | |
| 2006/0060412 | A1* | 3/2006 | Bolourchi | B62D 5/06 180/443 |
| 2006/0225947 | A1 | 10/2006 | Nyberg | |
| 2007/0256885 | A1 | 11/2007 | Ammon et al. | |
| 2012/0261208 | A1 | 10/2012 | Rothhämel | |
| 2017/0073935 | A1* | 3/2017 | Friend | E02F 9/265 |

FOREIGN PATENT DOCUMENTS

| | | |
|---|---|---|
| CN | 201506694 | 6/2010 |
| CN | 102030037 A | 4/2011 |
| CN | 202060456 | 11/2011 |
| CN | 104015788 | 9/2014 |
| CN | 104555736 | 4/2015 |
| CN | 204897339 | 12/2015 |
| CN | 108298429 | 7/2018 |
| DE | 10254111 A1 | 6/2004 |
| EP | 2927093 | 10/2015 |
| EP | 3042827 | 7/2016 |
| WO | 2014/082426 | 6/2014 |

OTHER PUBLICATIONS

EP Examination Report for Application No. 16923582.7 dated Jun. 1, 2021, 8 pages.

* cited by examiner

ACTIVE STEERING SYSTEM FOR HOISTING MACHINERY AND HOISTING MACHINERY

RELATED APPLICATIONS

The present application is a 35 U.S.C. § 371 national phase application of PCT International Application No. PCT/CN2016/108519, filed Dec. 5, 2016, the disclosure of which is hereby incorporated herein by reference in its entirety.

TECHNICAL FIELD

The present invention relates to the technical field of engineering machinery, in particular to an active steering system for a hoisting machinery and a hoisting machinery.

BACKGROUND ART

At present, all terrain cranes adopt a mechanical hydraulic power steering system and an electro-hydraulic proportional steering system. Owing to its mature technology and high reliability, the mechanical hydraulic power steering system is widely adopted across the industry. The electro-hydraulic proportional steering system can realize multi-axle and multi-mode steering. The existing steering systems cannot resolve a contradiction between flexibility at a low speed and stability at a high speed.

In modern times, the automobile steering technology has gone through several stages including a hydraulic power steering stage, an electric power steering stage, a steer-by-wire stage and an active steering stage. An active steering system not only has a variable transmission ratio function of steer by wire, but also reserves mechanical connection between a steering wheel and steering wheels, thereby ensuring safety and reliability of a steering system, and becoming a development direction of a steering system.

In the prior art, an eight-axle automobile chassis crane and its steering control system and method are available (please refer to the patent with a publication number of CN102030037A), wherein, a steering wheel changes a transfer direction through an angle driver, and finally outputs a steering angle of a steering wheel to a steering gear, and further controls steering of wheels. The steering control system adopts a fixed transmission ratio of a steering angle, and a velocity ratio of an angle driver cannot be changed, and can be only used to change a transfer direction. The magnitude of a transmission ratio mainly depends on a transmission ratio of a steering gear, while a transmission ratio of a steering gear is determined by internal design of a steering gear, which is also a system with a fixed ratio.

An active steering system which integrates an electric power steering function and a control method are further available (please refer to the patent with a publication number of CN101695935A). As shown in FIG. 1, the active steering system in sequence includes a steering wheel a1, a steering input shaft a2, a planetary gear mechanism a5, a steering output shaft a6, a steering engine a9, a steering tie rod a10, a steering motor a4 arranged on the planetary gear mechanism a5, a steering angle sensor, a yaw velocity sensor and a lateral acceleration sensor. An ideal transmission ratio and a steering angle correction of a steering system can be calculated according to the steering wheel torque sensor signals acquired by a steering wheel torque sensor a3 arranged on a steering input shaft a2, signals acquired by a steering angle sensor, a lateral acceleration sensor and a yaw velocity sensor and the manipulation stability of a complete vehicle. An ECU is configured to send control signals to a steering motor a4, so as to drive the planetary gear mechanism a5 to implement variable transmission ratio control and active steering intervention control. The ECU sends control signals of an power assisted motor to an power assisted motor a7 according to feedback signals of a steering motor sent back by a steering motor a4, determines magnitude of a power assisted torque and return-to-center control torque of a power assisted motor a7, and drives steering of a front wheel a11 together with a steering tie rod a10, thereby implementing power-assisted control and return-to-center control of electric power steering.

In the above eight-axle automobile chassis crane and its steering control system, a fixed steering ratio is adopted, and the contradiction between flexibility at a low speed and stability at a high speed cannot be resolved: hydraulic steering can make steering lighter, however, under such operating conditions as steering for a large steering angle at a low speed, turning around and steering at a small ground, a steering wheel needs to be turned repeatedly and sharply, therefore, steering flexibility is poor with fatigability. When a vehicle drives at a high speed, locking of a rear axle can improve driving stability to a certain extent, however, the degree of improvement is limited, and in special circumstances such as snowy and rainy days or sharp turns, a possibility of instability may still exist. Under such conditions of poor wheel alignment parameters, non-standard tire pressure and unleveled suspension, off tracking will occur during a straight driving process, and a driver needs to constantly correct, thereby increasing a driving burden.

In the above active steering system which integrates an electric power steering function, the active steering system integrates an electric power steering function. Since a steering resistance of a crane chassis is large, electric power steering cannot satisfy requirements of a system, and the floor space is relatively large due to its arrangement mode, therefore, the arrangement is difficult in actual operations.

It should be noted that, the information disclosed in the background art of the present invention is merely intended to increase the understanding of an overall background of the present invention, and should not be deemed as admitting or implying in any way that the information has constituted prior art that is well known to those skilled in the art.

SUMMARY OF THE INVENTION

An objective of the present invention is to provide an active steering system used for a hoisting machinery and a hoisting machinery, so as to improve the capability of the hoisting machinery in overcoming a steering resistance, and enlarge application scopes of the active steering system.

In order to realize the above objective, the present invention provides an active steering system for a hoisting machinery, wherein the hoisting machinery includes a steering wheel and wheels. The active steering system includes an active steering device, a hydraulic power steering gear and a hydraulic power steering system, wherein the active steering device is arranged between the steering wheel and a pitman arm of the hoisting machinery, so as to adjust a steering ratio of the steering wheel to the pitman arm according to a driving cycle of the hoisting machinery, and the hydraulic power steering gear is arranged between the steering wheel and the pitman arm, so as to control the hydraulic power steering system to drive the steering of wheels.

In some embodiments, the active steering device is arranged between the steering wheel and the hydraulic power steering gear, the active steering device is configured to change a transmission ratio of an input of the steering wheel to an output of the hydraulic power steering gear.

In some embodiments, the active steering device is arranged between the hydraulic power steering gear and the pitman arm, the active steering device is configured to change a transmission ratio of an output of the hydraulic power steering gear to an output of the pitman arm.

In some embodiments, the active steering device includes a differential gear train, and the differential gear train is configured to adjust a transmission ratio of an input shaft to an output shaft of the differential gear train so as to change a steering ratio of the steering wheel to the hydraulic power steering gear.

In some embodiments, the active steering device further includes a motor, the differential gear train includes a planet wheel, a first gear and a second gear, the motor is connected with the planet wheel in a driving manner through a tie bar, the first gear is engaged with the planet wheel and is connected with the steering wheel through the input shaft, and the second gear is engaged with the planet wheel and is connected with the hydraulic power steering gear through the output shaft.

In some embodiments, the differential gear train further includes an intermediate shaft, and the intermediate shaft is connected between the input shaft and the first gear through two gears which are arranged perpendicularly, such that a transfer direction of the input shaft is perpendicular to a transfer direction of the output shaft, and the active steering device integrates functions of an angle driver.

In some embodiments, the motor includes a worm gear and a worm, the worm gear is connected with the tie bar, and the worm gear drives the planet wheel to rotate through the tie bar under the driving effect of the worm.

In some embodiments, the active steering system at least has a mode of driving at a high speed and a mode of driving at a low speed, in the mode of driving at a high speed, a steering ratio of the steering wheel to the wheels is relatively small; while in the mode of driving at a low speed, a steering ratio of the steering wheel to the wheels is relatively large.

In some embodiments, in the mode of driving at a high speed, a rotation direction of the motor is opposite to an input direction of the steering wheel, so as to increase an input angle of the steering wheel; in the mode of driving at a low speed, a rotation direction of the motor is the same as an input direction of the steering wheel, so as to decrease an input angle of the steering wheel.

In some embodiments, the active steering system further includes an angle sensor, an ECU and a controller, wherein the angle sensor is configured to measure an input steering angle of the steering wheel, and transfer input steering angle signals of the steering wheel and pose signals of the hoisting machinery together to the ECU, and the ECU is configured to give instructions to the controller according to the steering angle signals, so as to control the active steering device.

In some embodiments, the active steering system further includes a locking device, wherein the locking device is configured to lock the active steering device when the active steering device malfunctions, such that the active steering device loses its function of changing a steering ratio of the steering wheel to the wheels.

In order to realize the above objective, the present invention further provides hoisting machinery, including the above active steering system for a hoisting machinery.

In some embodiments, the wheels include front wheels and rear wheels, the hydraulic power steering system is configured to drive steering of the front wheels, and steering of the rear wheels is driven by an electric hydraulic steering system.

Based on the above technical solution, in the present invention, an active steering device is arranged between a steering wheel and a pitman arm. The active steering device can adjust a steering ratio of the steering wheel to the pitman arm according to a driving cycle of hoisting machinery, thereby realizing active control of steering of wheels, and improving operational stability, active safety and manipulation comfort. In addition, in the active steering system, a hydraulic power steering system is adopted to drive steering of wheels, which can improve capability of overcoming steering resistance and can be applicable to multiple chassis of cranes, thereby enlarging application ranges of the active steering system.

Figure 1:
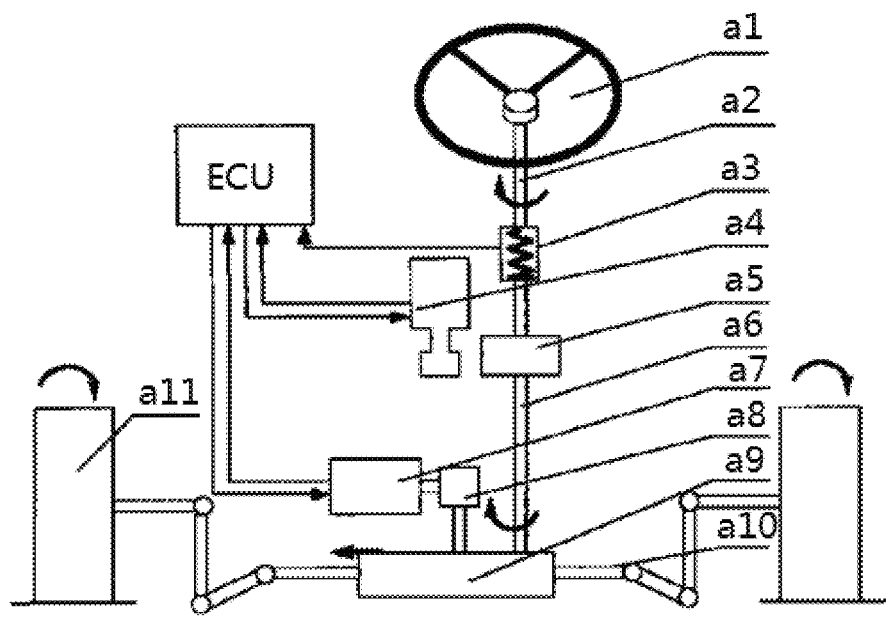
FIG. 1 is a schematic diagram of an active steering system which integrates an electric power steering function in the prior art.

Reference numerals in the figures: a1—steering wheel, a2—steering input shaft, a3—steering wheel torque sensor, a4—steering motor, a5—planetary gear mechanism, a6—steering output shaft, a7—power assisted motor, a8—worm gear and worm reducing mechanism, a9—steering engine, a10—steering tie rod, a11—wheels;

1—steering wheel, 2—angle sensor, 3—active steering device, 4—angle sensor, 5—steering drive shaft, 6—hydraulic power steering gear, 7—pitman arm, 8—first steering tube, 9—pitman arm, 10—second steering tube, 11—third steering tube, 12—controller, 31—input shaft, 32—output shaft, 33—planet wheel, 34—tie bar, 35—worm, 36—worm gear, 37—intermediate shaft.

DETAILED DESCRIPTION OF THE EMBODIMENTS

A detailed description will be further given below on technical solutions of the present invention through accompanying drawings and embodiments.

In description of the present invention, it needs to be understood that orientation or position relations denoted by the terms including "center" "transverse", "longitudinal", "front", "rear", "left", "right", "upper", "lower", "vertical", "horizontal", "top", "bottom", "inner", "outer" and the like are orientation or position relations based on illustration in the figures, and are merely intended to facilitate description of the present invention and to simplify the description, instead of indicating or implying that the denoted devices or elements necessarily have specific orientations or are constructed and operated in specific orientations, and thus they should not be understood as a limitation to the protection scope of the present invention.

Figure 2:
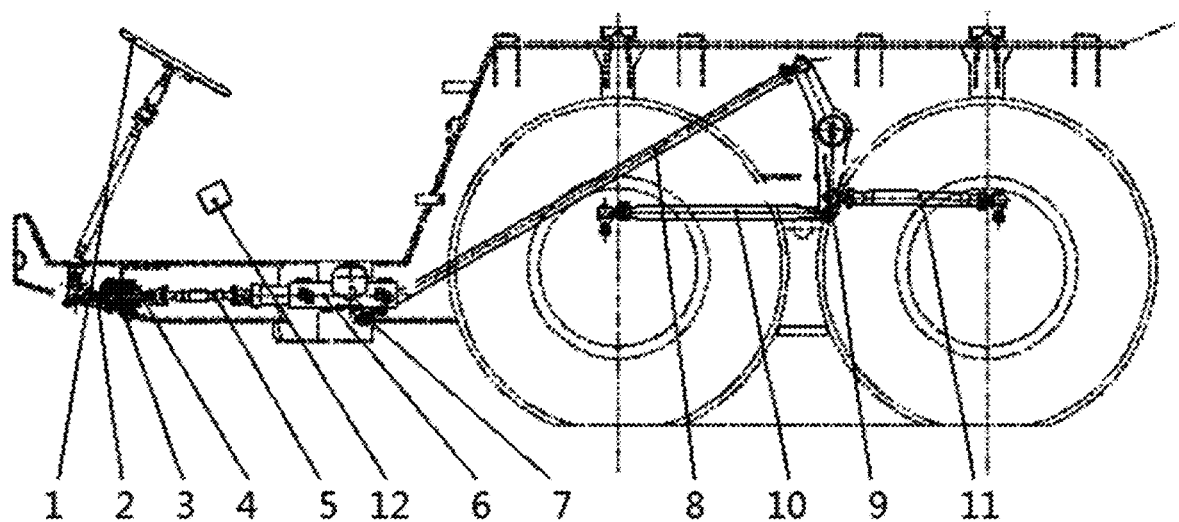
FIG. 2 is a structural schematic diagram of one embodiment of an active steering system for a hoisting machinery in the present invention.

FIG. 2 shows a structural schematic diagram of an embodiment of an active steering system for a hoisting machinery of the present invention. In the present embodiment, the hoisting machinery includes a steering wheel 1 and wheels. The active steering system includes an active steering device 3, a hydraulic power steering gear 6 and a hydraulic power steering system, wherein the active steering device 3 is arranged between the steering wheel 1 and a pitman arm 7, and the active steering device 3 can adjust a steering ratio of the steering wheel 1 to the pitman arm 7 according to a driving cycle of the hoisting machinery. The hydraulic power steering gear 6 is arranged between the steering wheel 1 and the pitman arm 7 of the hosting machinery, so as to control the hydraulic power steering system to drive the steering of the wheels. Wherein under a combined action of the hydraulic power steering gear 6, the pitman arm 7, and a hydraulic power cylinder in a hydraulic power steering system, steering of the wheels can be driven. Meanwhile, under the effect of the active steering device 3, active control of steering of wheels can be further realized.

In the above embodiment, an active steering device 3 is arranged between a steering wheel 1 and a pitman arm 7, and the active steering device 3 can adjust a steering ratio of the steering wheel 1 to the pitman arm 7 according to a driving cycle of hoisting machinery, thereby realizing active control of steering of wheels. Except for a driver who can perform steering operation on wheels through the steering wheel 1, the hoisting machinery can also actively adjust a steering angle of wheels through the active steering device 3, thereby improving operational stability, active safety and manipulation comfort. In the active steering system, a hydraulic power steering system is adopted to drive steering of wheels, which can improve capability of overcoming steering resistance and can be applicable to multiple chassis of cranes, thereby enlarging application ranges of the active steering system.

Specifically speaking, an active steering device 3 can be arranged between a steering wheel 1 and a hydraulic power steering gear 6, so as to change a transmission ratio of an input of the steering wheel 1 to an output of the hydraulic power steering gear 6 through the active steering device 3, and further adjust steering of wheels, thereby realizing active control of steering of wheels.

The active steering device 3 can also be arranged between the hydraulic power steering gear 6 and the pitman arm 7, so as to change a transmission ratio of an output of the hydraulic power steering gear 6 to an output of the pitman arm 7 through the active steering device 3, and further to adjust steering of wheels, thereby realizing active control of steering of wheels.

Wherein the active steering device 3 can include a differential gear train, the differential gear train includes an input shaft 31 and an output shaft 32, and a steering ratio of a steering wheel 1 to a hydraulic power steering gear 6 can be adjusted through adjusting a transmission ratio of an input shaft 31 to an output shaft 32.

Figure 3:
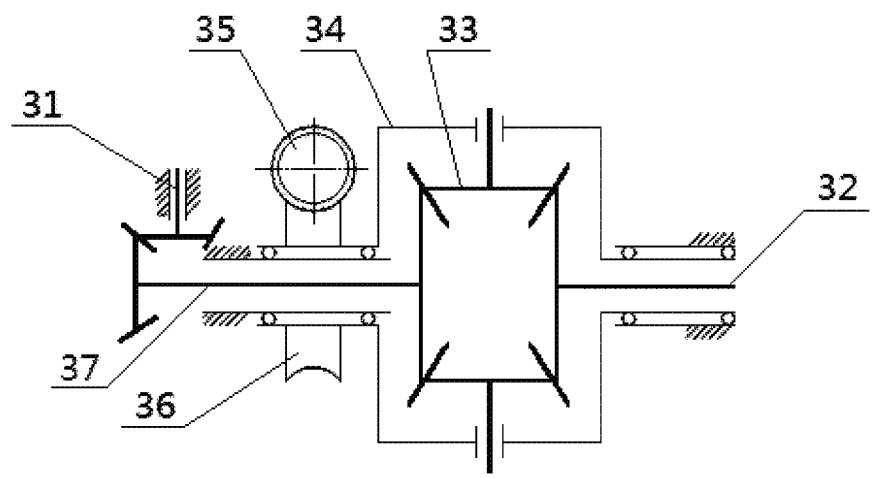
FIG. 3 is a structural schematic diagram of an active steering device in one embodiment of an active steering system for a hoisting machinery in the present invention.
Figure 4:
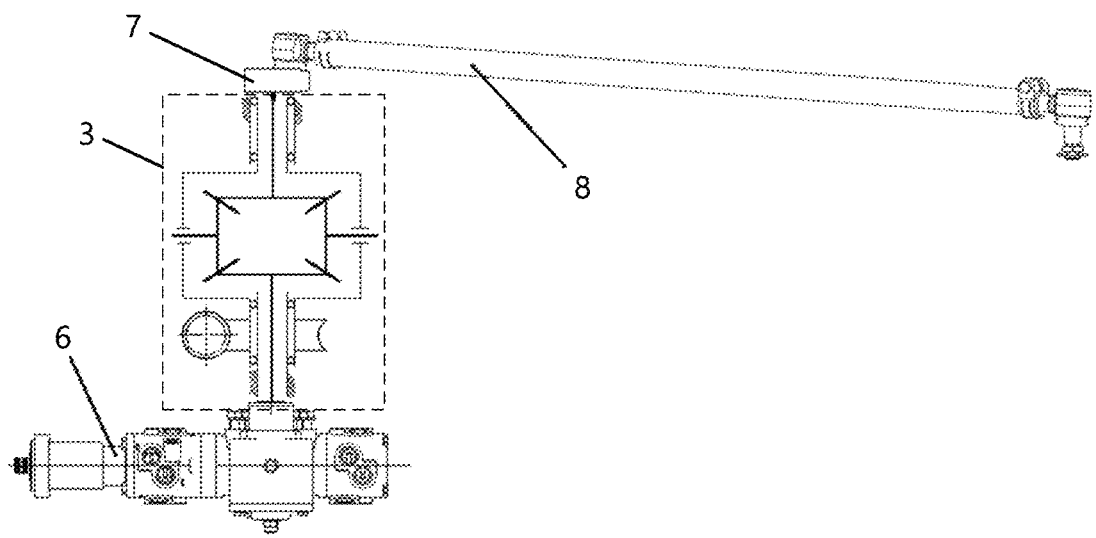
FIG. 4 is a structural schematic diagram of an active steering system according to embodiments of the present invention.

As a specific embodiment of the active steering device 3, as shown in FIG. 3, the active steering device 3 further includes a motor, and the differential gear train includes a planet wheel 33, a first gear and a second gear, wherein the motor is connected with the planet wheel 33 in a driving manner through a tie bar 34, the first gear is engaged with the planet wheel 33 and is connected with the steering wheel 1 through the input shaft 31, and the second gear is engaged with the planet wheel 33 and is connected with the hydraulic power steering gear 6 through the output shaft 32.

In this way, a planet wheel 33 can be driven to rotate through a motor, and the rotation of the planet wheel 33 can change a transmission ratio of a first gear to a second gear, so as to change a transmission ratio of an input shaft 31 to an output shaft 32, while one end of the input shaft 31 is connected with the steering wheel 1, and one end of the output shaft 32 is connected with a hydraulic power steering gear 6, therefore, under the effect of a motor, a steering ratio of the steering wheel 1 to the hydraulic power steering gear 6 can be changed, meanwhile, the motor is controlled actively, and it can be started when necessary, and can also be stopped when necessary, that is, the active steering device 3 can realize active control.

As shown in FIG. 3, the differential gear train further includes an intermediate shaft 37. The intermediate shaft 37 is connected between an input shaft 31 and a first gear through two gears which are arranged vertically, such that the transfer direction of the input shaft 31 is vertical to the transfer direction of the output shaft 32, and the active steering device 3 integrates functions of an angle driver. In this way, the active steering device is integrated with the angle driver, and the two can be integrated in one module during specific setting, thereby saving floor space and enabling the overall structure to be more compact.

Preferably, a motor can adopt a worm gear and worm structure which includes a worm gear 36 and a worm 35, wherein the worm gear 36 is connected with the tie bar 34, and the worm gear 36 drives the planet wheel 33 to rotate through the tie bar 34 under the driving effect of the worm 35.

According to a driving cycle, an active steering system of the present invention can automatically adjust a steering ratio, with at least a mode of driving at a high speed and a mode of driving at a low speed. In a mode of driving at a high speed, a steering ratio of a steering wheel 1 to wheels is relatively small, and an indirect steering ratio enables manipulation of a vehicle to be more stable, and a better capability in straight driving is kept; while in a mode of driving at a low speed, or when a vehicle is driving on a winding road at an intermediate speed, a steering ratio of a steering wheel 1 to wheels is relatively large, thereby being capable of providing a more direct steering ratio, so as to improve accuracy and flexibility of steering.

Specifically, in a mode of driving at a high speed, a rotation direction of the motor is opposite to an input direction of the steering wheel 1, so as to increase an input angle of the steering wheel 1, such that manipulation of a vehicle is more stable; in a mode of driving at a low speed, a rotation direction of the motor is the same as an input direction of the steering wheel 1, so as to decrease an input angle of the steering wheel 1 and improve accuracy and flexibility of steering.

In addition, the active steering system can further include an angle sensor 2, an ECU and a controller 12, wherein the angle sensor 2 is configured to measure an input steering angle of the steering wheel 1, and transfer input steering angle signals of the steering wheel 1 and pose signals of the hoisting machinery together to the ECU, and the ECU is configured to give instructions to the controller 12 according to received signals, so as to control the active steering device 3. Wherein pose signals can include speed of a vehicle, steering angle of wheels, and yaw velocity signals of hoisting machinery, etc.

The active steering system can further include an angle sensor 4 which is used for detection and feedback control, the angle sensor 4 feeds back detected steering angle of wheels, speed of a vehicle, yaw velocity and other signals to an ECU, and according to the signals, the ECU can correct the steering angle of wheels which is obtained through calculation according to signals fed back by an angle sensor 2, thereby realizing more accurate control.

The active steering system can further include a locking device, wherein the locking device is configured to lock the active steering device 3 when the active steering device 3 malfunctions, such that the active steering device 3 loses its function of changing a steering ratio of the steering wheel 1 to the wheels. At this time, the active steering device 3 is equivalent to a mechanical driving device, and then a steering angle of an input shaft 31 of the active steering device 3 is the same as a steering angle of an output shaft 32.

Based on an active steering system for a hoisting machinery in each of the above embodiments, the present invention further provides a hoisting machinery which includes an active steering system for a hoisting machinery. Positive effects possessed by the active steering system for a hoisting machinery in each of the above embodiments are also applicable to the hoisting machinery, and will not be repeated redundantly herein.

An active steering system of the present invention can be applicable to various types of hoisting machinery, especially multi-axle cranes. In such cranes, wheels include front wheels and rear wheels, and a hydraulic power steering system is configured to drive steering of front wheels, that is, an active steering device 3 is mainly configured to actively control steering of front wheels, while steering of rear wheels is driven through an electric hydraulic steering system. Under the effect of an active steering system 3, steering of front wheels can overcome a larger resistance, while rear wheels need no special setting, and an ordinary electronic control steering system can conveniently and easily realize steering. For cranes with rear wheels being of electronically controlled hydraulic power steering, the steering can be in multiple modes, for example, a steep turn mode, a crab steering mode, etc. In different modes, a change of speed of a vehicle will inevitably lead to a change in steering performance of a vehicle. Through the adoption of an active steering system in the present invention, an operating pose is monitored, pose signals of a vehicle are fed back to an ECU, and the ECU sends control signals to a controller through calculation, controls a motor to change a steering angle of front wheels in real time, and maintains stability of steering of a vehicle.

In the above multi-axle cranes, front wheels control a motor in an active steering device mainly in combination with the speed of a vehicle, the steering angle of a steering wheel, and the steering angle of wheels, so as to further change a steering ratio, and a steering angle of wheels is coordinated by means of a mechanical trussing; an electro-hydraulic proportional system at a rear axle can adopt another independent control system, with its control principles being mainly as follows: a controller receives such signals as the steering angle and speed of a vehicle of one axle, an electro-hydraulic proportional controller at a rear axle calculates to obtain a theoretical steering angle required by wheels of a rear axle according to feedback signals, and further controls opening and closing of a proportional valve group in combination with an actual steering angle of wheels at a rear axle, thereby achieving the purpose of controlling a steering angle of a rear axle.

A description will be given below on one embodiment of an active steering system for hoisting machinery and hoisting machinery of the present invention:

As shown in FIG. 2, the active steering system includes a steering wheel 1, an angle sensor 2, an active steering device 3, an angle sensor 4, a steering drive shaft 5, a hydraulic power steering gear 6, a pitman arm 7, a first steering tube 8, a steering rocker arm 9, a second steering tube 10, a third steering tube 11 and a controller 12.

A steering wheel 1 inputs a predetermined steering angle, an angle sensor 2 measures the input steering angle, and transfers the input steering angle together with the speed of a vehicle, steering angle of wheels, and yaw velocity signals to an ECU, the ECU calculates according to these signals, and gives instructions to a controller 12, and the controller 12 is configured to adjust the rotational speed and direction of a motor in the active steering device 3, and perform feedback control through an angle sensor 4. The hydraulic power steering gear 6, the pitman arm 7 and a hydraulic power cylinder on an axle act together to drive wheels to rotate, and transfer to each wheel to reach a corresponding angle through a first steering tube 8, a steering rocker arm 9, a second steering tube 10 and a third steering tube 11. In the present embodiment, a mechanical driving structure for steering of wheels includes a first steering tube 8, a steering rocker arm 9, a second steering tube 10 and a third steering tube 11. In other embodiments, the mechanical driving structure can also be of other forms which can be acquired by those skilled in the art, and the other forms will not be repeated redundantly herein.

In the present embodiment, the opening of a valve in a hydraulic power steering gear 6 is changed through an active steering device 3, so as to adjust pressure of a hydraulic power system, and wheels are pushed to rotate through oil pressure in the hydraulic power steering system, thereby realizing change of an angle of front wheels, and realizing control of a steering angle of wheels. The change in a steering angle of front wheels of a vehicle is jointly controlled by a steering wheel 1 and a motor in the active steering device 3. A ratio of a steering angle of the steering wheel 1 to a steering angle of front wheels is related to the rotation of a motor in the active steering device 3, and the rotation of the motor can change the ratio, thereby realizing a function of a variable steering ratio.

The present embodiment combines a hydraulic power steering system with a rear-axle electro-hydraulic proportional multi-mode steering system, and a rotational speed and direction of a motor can be controlled according to speed of a vehicle, steering angle of wheels, yaw velocity and steering mode.

Through a description on multiple embodiments of an active steering system for hoisting machinery and hoisting machinery of the present invention, it can be seen that, embodiments of an active steering system for hoisting machinery and hoisting machinery of the present invention at least have one or more of the following advantages:

1. Through the addition of an active steering device between a steering wheel and a hydraulic power steering gear, a function of active control of steering of wheels can be realized;

2. The active steering device includes a differential gear train, thereby becoming double-degree-of-freedom driving, and realizing differential output of an input shaft and an output shaft;

3. An active steering device integrates functions of an angle driver, and the space occupied by an angle driver can be reduced through integration, therefore, the structure is more compact;

4. In combination with characteristics of a hydraulic power steering system and a rear-axle electro-hydraulic proportional steering system, matching optimization control under various operating conditions can be performed, a rotational speed and direction of a motor can be controlled based on a driving cycle, and a steering ratio of a vehicle can be adjusted automatically; when a vehicle drives at a high speed, an indirect steering ratio enables manipulation of a vehicle at a high speed to be more stable, and a better capability of straight driving can be kept; otherwise, when a vehicle drives on a winding road at a low or intermediate speed, the system will provide a more direct steering ratio, so as to improve accuracy and flexibility of steering.

5. An active steering device includes a locking device, and automatic locking can be realized when an active steering control part malfunctions, therefore, the safety is favorable; and 6. Inheritability is possessed, and an active steering device can be directly added on the original steering system, therefore, restructuring of the original vehicle is convenient and feasible.

The descriptions above are merely one embodiment of the present invention. It should be noted that, for those skilled in the art, numerous improvements and modifications can also be made under the premise of not departing from principles of the present invention, and these improvements and modifications should also be deemed to fall within the protection scope of the present invention.

The invention claimed is:

1. A hoisting machinery, comprising-a steering wheel; wheels;
a pitman arm;
an active steering device, arranged between the steering wheel and the pitman arm, for adjusting a steering ratio of the steering wheel to the pitman arm according to a driving cycle of the hoisting machinery;
a hydraulic power steering system;
a hydraulic power steering gear arranged between the steering wheel and the pitman arm, for controlling the hydraulic power steering system to drive the steering of the wheels
an angle sensor and a controller,
wherein the angle sensor is configured to measure an input steering angle of the steering wheel, and transfer input steering angle signals of the steering wheel to the controller, and the controller is configured to control the active steering device according to the steering angle signals and pose signals of the hoisting machinery.

2. The hoisting machinery of claim 1, wherein the active steering device is arranged between the steering wheel and the hydraulic power steering gear, the active steering device is configured to change a transmission ratio of an input of the steering wheel to an output of the hydraulic power steering gear.

3. The hoisting machinery of claim 1, wherein the active steering device is arranged between the hydraulic power steering gear and the pitman arm, the active steering device is configured to change a transmission ratio of an output of the hydraulic power steering gear to an output of the pitman arm.

4. The hoisting machinery of claim 1, wherein the active steering device comprises a differential gear train, the differential gear train comprises an input shaft to an output shaft, the active steering device is configured to adjust a transmission ratio of the input shaft to an output shaft so as to change a steering ratio of the steering wheel to the hydraulic power steering gear.

5. The hoisting machinery of claim 4, wherein the active steering device further comprises a motor, the differential gear train comprises a planet wheel, a tie bar, a first gear and a second gear, the motor is connected with the planet wheel in a driving manner through the tie bar, the first gear is engaged with the planet wheel and is connected with the steering wheel through the input shaft, and the second gear is engaged with the planet wheel and is connected with the hydraulic power steering gear through the output shaft.

6. The hoisting machinery of claim 5, wherein the differential gear train further comprises an intermediate shaft, and the intermediate shaft is connected between the input shaft and the first gear through two gears which are arranged perpendicularly, such that a transfer direction of the input shaft is perpendicular to a transfer direction of the output shaft.

7. The hoisting machinery of claim 5, further comprising a worm gear and a worm, an output shaft of the motor is connected with the worm, the worm gear is connected with the tie.

8. The hoisting machinery of claim 5, wherein the hoisting machinery at least has a mode of driving at a high speed and a mode of driving at a low speed, in the mode of driving at a high speed, a steering ratio of the steering wheel to the wheels is relatively small; while in the mode of driving at a low speed, a steering ratio of the steering wheel to the wheels is relatively large.

9. The hoisting machinery of claim 8, wherein in the mode of driving at a high speed, a rotation direction of the motor is opposite to an input direction of the steering; in the mode of driving at a low speed, a rotation direction of the motor is the same as an input direction of the steering.

10. The hoisting machinery of claim 1, further comprising a locking device, wherein the locking device is configured to lock the active steering device when the active steering device malfunctions, such that the active steering device loses its function of changing a steering ratio of the steering wheel to the wheels.

11. The hoisting machinery of claim 1, further comprising an electric hydraulic steering system wherein the wheels comprise front wheels and rear wheels, the hydraulic power steering system is configured to drive steering of the front wheels, and steering of the rear wheels is driven by the electric hydraulic steering system.

* * * * *